United States Patent
Park

(10) Patent No.: US 7,604,101 B2
(45) Date of Patent: Oct. 20, 2009

(54) DAMPING FORCE CONTROL VALVE AND SHOCK ABSORBER USING THE SAME

(75) Inventor: Kyu Shik Park, Seoul (KR)

(73) Assignee: Mando Corporation, Seoul (KR)

( * ) Notice: Subject to any disclaimer, the term of this patent is extended or adjusted under 35 U.S.C. 154(b) by 304 days.

(21) Appl. No.: 11/709,335

(22) Filed: Feb. 20, 2007

(65) Prior Publication Data

US 2007/0227846 A1 Oct. 4, 2007

(30) Foreign Application Priority Data

Feb. 20, 2006 (KR) .................. 10-2006-0016094

(51) Int. Cl.
*F16F 9/54* (2006.01)
(52) U.S. Cl. ............... 188/322.2; 188/315; 188/322.13; 188/322.19
(58) Field of Classification Search ............. 188/222.2, 188/315, 322.13, 322.15, 280, 297, 317, 188/318, 322.19, 320, 266.6, 282.1–282.6, 188/282.8
See application file for complete search history.

(56) References Cited

U.S. PATENT DOCUMENTS

| | | | | |
|---|---|---|---|---|
| 5,934,421 A | * | 8/1999 | Nakadate et al. | 188/299.1 |
| 6,119,829 A | * | 9/2000 | Nakadate | 188/266.6 |
| 2005/0167216 A1 | | 8/2005 | Park | |

FOREIGN PATENT DOCUMENTS

EP 0504624 A2 9/1992

JP 09-126263 A 5/1997

(Continued)

*Primary Examiner*—Melanie Torres
(74) *Attorney, Agent, or Firm*—Seed IP Law Group PLLC

(57) ABSTRACT

The present invention relates to a damping force control valve and a shock absorber using the same. An object of the present invention is to provide a damping force control valve, in which the damping force characteristic at a high speed is maintained in a low level, and a shock absorber using the same. According to the present invention for achieving the object, there is provided a damping force control valve, which includes a high pressure region in communication with a tension chamber of a cylinder and a low pressure region in communication with a reservoir chamber, and controls a damping force by adjusting pressure of a pilot chamber by orifices, each of which has a channel controlled to open or close by a spool. The valve comprises a main valve installed between the high and low pressure regions and controlled to open or close according to pressure of the high pressure region, an initial preload and pressure of the pilot chamber, the main valve allowing working fluid to flow from the high pressure region to the low pressure region when being opened; a first fixed orifice in communication with the high pressure region; a bypass channel for discharging the working fluid supplied by opening a first variable orifice to the low pressure region, the first variable orifice making the first fixed orifice and the low pressure region communicate with each other; and a second fixed orifice for controlling the working fluid discharged to the low pressure region so that the working fluid supplied by opening a second variable orifice controls a pressure of the pilot chamber, the second variable orifice making the first fixed orifice and the pilot chamber communicate with each other.

6 Claims, 7 Drawing Sheets

FOREIGN PATENT DOCUMENTS

| | | |
|---|---|---|
| JP | 11-094004 A | 4/1999 |
| JP | 2001-012534 A | 1/2001 |
| JP | 2002-013582 A | 1/2002 |
| JP | 2004-263752 A | 9/2004 |
| JP | 2006-038097 A | 2/2006 |

* cited by examiner

DAMPING FORCE CONTROL VALVE AND SHOCK ABSORBER USING THE SAME

BACKGROUND OF THE INVENTION

1. Field of the Invention

The present invention relates to a damping force control valve and a shock absorber using the same, and more particularly, to a damping force control valve having an orifice installed to an inlet of a pilot channel in order to provide a high-speed damping force when a shock absorber is operated in a soft mode, and a shock absorber using the same.

2. Description of the Prior Art

Generally, a shock absorber of a vehicle is installed to a moving means such as a car, and thus, absorbs or buffers vibrations or shocks transferred from road wheels in contact with a road surface.

This shock absorber can improve the ride comfort by lowering a damping force and thus absorbing vibrations caused by unevenness of a road surface when a vehicle is ordinarily running, and enhance the handling stability by raising a damping force and thus restraining posture change of the vehicle body when the vehicle turns, accelerates, brakes or runs at high speed.

Meanwhile, in order to improve the ride comfort and handling stability, a shock absorber is recently provided with a damping force control valve mounted to one side thereof so as to suitably adjust a damping force, so that it is developed up to a damping force control shock absorber capable of suitably controlling a damping force according to a road surface state a the running state.

In general, most of conventional damping force control shock absorbers control a damping force in a solenoid manner, and are mainly classified into a reverse type and a normal type depending on a damping force control method.

The aforementioned damping force control shock absorber is configured to increase or decrease both rebound and compressing damping forces at the same time according to a solenoid current. For example, the conventional damping force control shock absorber controls a damping force in rebound and compression strokes in a soft mode by application of a certain solenoid current, and also controls the damping force in a hard mode by application of a higher solenoid current. Such damping force control is realized in such a manner that a spool moving according to the solenoid operation controls back pressure formation in and adjustment of a pilot chamber formed in the rear of the damping force control valve.

FIG. 1 is a sectional view showing a conventional damping force control valve of a shock absorber, and FIG. 2 is a schematic hydraulic circuit diagram showing a channel in the conventional damping force control valve. A conventional damping force control valve 10 includes a spool rod 20 installed to an upper portion of an actuator 15 and having a plurality of channels allowing fluid communication, and a spool 25 installed to the spool rod 20 and operated by the actuator 15 to open and close each channel, as shown in FIGS. 1 and 2.

In addition, a first ring disk 32 acting as a fixed orifice Kc is installed to the spool rod 20, and a lower retainer 34 having a communication port 34a allowing fluid flow is installed to an upper portion of the first ring disk 32.

Also, a second ring disk 36 acting as a main valve Km is installed to an upper portion of the lower retainer 34. The second ring disk 36 partitions a pilot chamber 45 formed in the upper portion of the lower retainer 34 from a high pressure region Ph. In addition, an upper retainer 38 having a communication port 38a allowing fluid flow is installed over the lower retainer 34.

Then, a nut 27 is coupled to the spool rod 20 to join the lower retainer 34 and the upper retainer 38. Meanwhile, a plug is installed to one end of the spool rod 20, and a spring 23 is interposed between the plug and the spool 25, so that the spool 25 is brought into close contact with to the actuator 15.

The spool 25 has a hollow portion (not shown) and a plurality of vertically stepped outer diameters. Here, an upper spool slit 25a and a lower spool slit 25b are defined by the stepped outer diameters of the spool 25.

The operation of the conventional damping force control valve configured as above will be explained with reference to FIG. 2.

As mentioned above, the damping force control valve 10 includes a first channel Qm having the main valve Km, a second channel Qr having a first variable orifice Kr, and a third channel Qc having a second variable orifice Kv and the fixed orifice Kc.

In the damping force control valve 10, the movement of the spool 25 controls the flow of the fluid that moves from a high pressure region Ph to a low pressure region Pl. When the spool 25 moves as mentioned above, the area of the first variable orifice Kr is reduced as that of the second variable orifice Kv is increased, while the area of the first variable orifice Kr is increased as that of the second orifice Kv is decreased.

The first channel Qm determines a valve characteristic in a middle high speed range of the soft/hard mode and has a spring preload in the form of a relief valve. The pilot chamber 45 is formed in a rear surface of the valve and thus its pressure determines a valve opening pressure, thereby making the damping force control possible.

In addition, the main valve Km is opened at different pressures according to a pressure Pc of the pilot chamber 45. The pressure Pc of the pilot chamber 45 is formed by the operation of the second variable orifice Kv installed in an upstream of the third channel Qc and the fixed orifice Kc installed in a downstream. Thus, the pressure of the pilot chamber 45 increases by controlling the area of the second variable orifice Kv, whereby the damping force characteristic is converted into the hard mode.

At this time, the sectional area of the second variable orifice Kv is decreased as that of the first variable orifice Kr is increased, while the sectional area of the second variable orifice Kv is increased as that of the first variable orifice Kr is decreased.

In addition, the second channel Qr determines a low-speed damping force characteristic in the soft mode, and its area is changed by the first variable orifice Kr to determine a damping force.

Also, the third channel Qc is configured such that the second variable orifice Kv is installed to its inlet and the fixed orifice Kc is installed to its exit so as to form a pressure of the pilot chamber 45.

In a case where the damping force characteristic formed in such a structure is the soft mode, the area of the first variable orifice Kr is increased to lower a low-speed damping force, and at the same time, the channel of the second variable orifice Kv is closed to lower the pressure of the pilot chamber 45, so that the main valve Km is opened at a low pressure.

Meanwhile, in case the damping force characteristic is the hard mode, the first variable orifice Kr is closed and the second variable orifice Kv is opened contrary to the soft mode, thereby increasing the opening pressure of the main valve Km and thus increasing a damping force of the shock absorber.

However, in the conventional damping force control valve 10 and the shock absorber using the same, if a pressure of the high pressure region Ph is increased under a high speed condition in the soft mode, fluid is introduced into the pilot chamber 45 through a gap formed between the spool rod 20 and the spool 25 defining the second variable orifice Kv, and thus the pressure of the pilot chamber 45 is increased. Thus, there is a problem in that the damping force characteristic may not keep the soft mode.

SUMMARY OF THE INVENTION

According to one embodiment, a damping force control valve is provided. An amount of fluid supplied to second and third channels is primarily limited to keep the pressure of inlets of first and second variable orifices to be relatively lower than that of a high pressure region, and thus a leakage to the second variable orifice is limited under a high-speed condition in a soft mode to keep the damping force characteristic at a high speed to be in a low level, and a shock absorber using the damping force control valve.

According to an aspect of the present invention, there is provided a damping force control valve, which includes a high pressure region in communication with a tension chamber of a cylinder and a low pressure region in communication with a reservoir chamber, and controls a damping force by adjusting pressure of a pilot chamber by orifices, each of which has a channel controlled to open or close by a spool. The valve comprises a main valve installed between the high and low pressure regions and controlled to open or close according to pressure of the high pressure region, an initial preload and pressure of the pilot chamber, the main valve allowing working fluid to flow from the high pressure region to the low pressure region when being opened; a first fixed orifice in communication with the high pressure region; a bypass channel for discharging the working fluid supplied by opening a first variable orifice to the low pressure region, the first variable orifice making the first fixed orifice and the low pressure region communicate with each other; and a second fixed orifice for controlling the working fluid discharged to the low pressure region so that the working fluid supplied by opening a second variable orifice controls a pressure of the pilot chamber, the second variable orifice making the first fixed orifice and the pilot chamber communicate with each other.

Preferably, the first variable orifice and the second variable orifice are opened or closed by the spool operated by one actuator, and each orifice cooperates with the spool to be controlled. Further, cross sectional areas of the first variable orifice and the second variable orifice may be in inverse proportion to each other. Furthermore, the main valve may comprise a membrane having an integrated disk shape.

In addition, according to another aspect of the present invention, there is provided a shock absorber comprising the aforementioned damping force control valve, wherein the high pressure region and the low pressure region of the damping force control valve are respectively to a compression chamber and a reservoir chamber of a cylinder.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, a preferred embodiment of the present invention will be described in detail with reference to the accompanying drawings.

Figure 1:
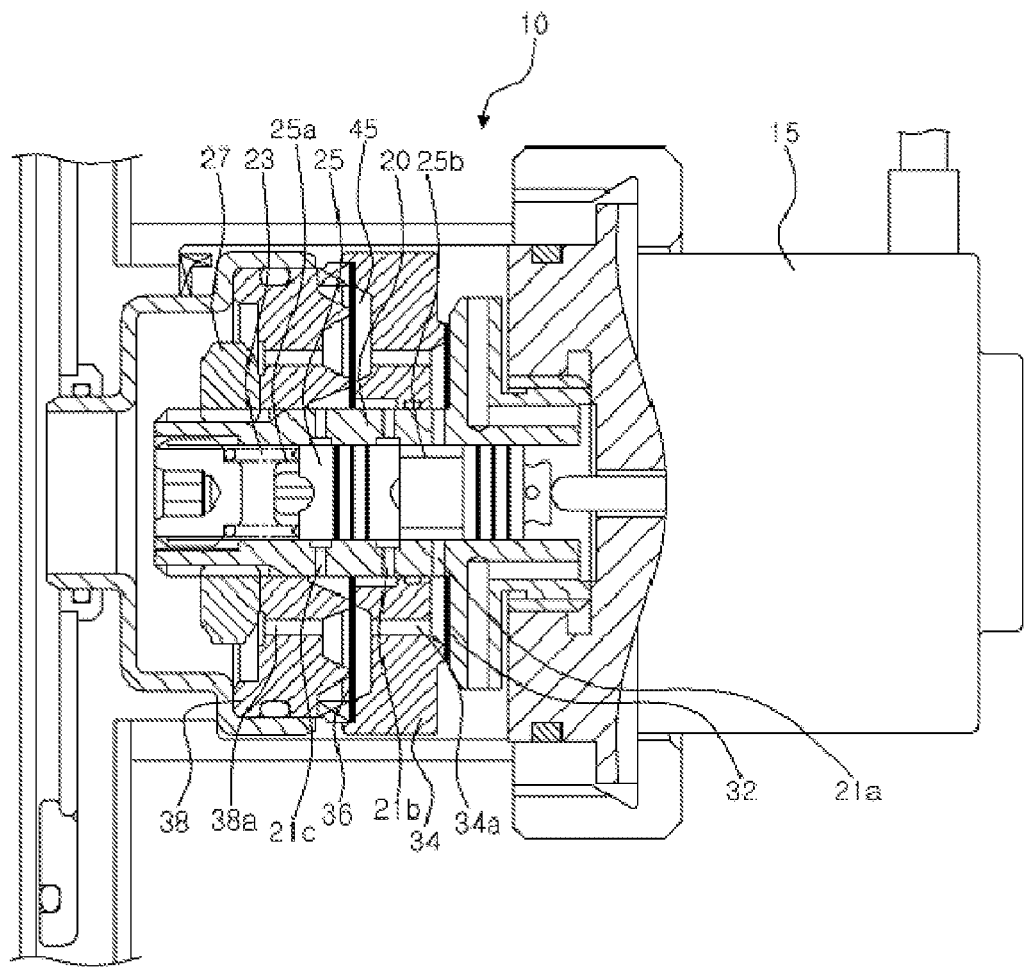
FIG. 1 is a sectional view showing a conventional damping force control valve of a shock absorber.
Figure 2:
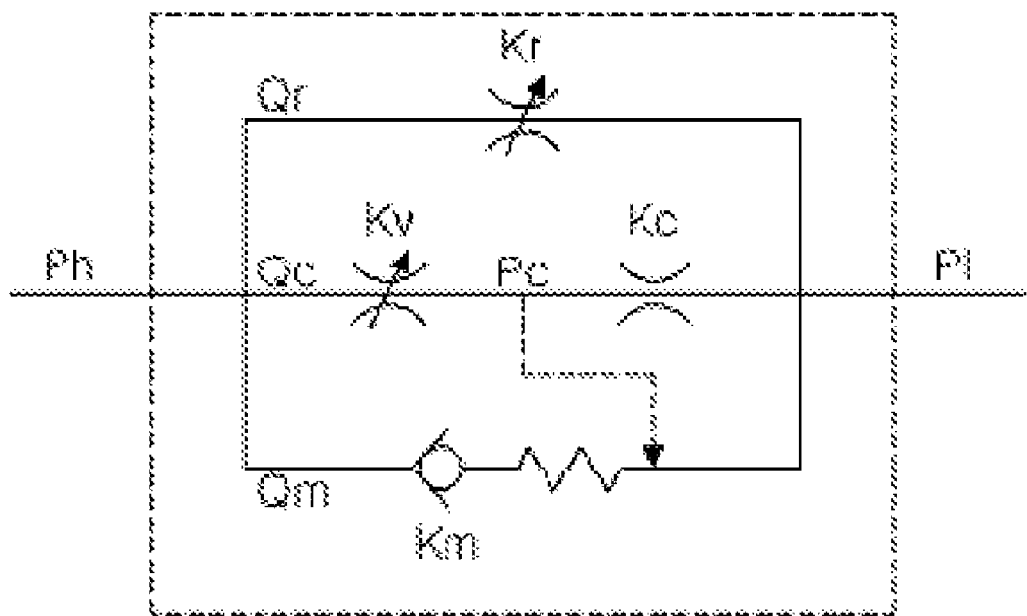
FIG. 2 is a schematic hydraulic circuit diagram showing a channel in the conventional damping force control valve.
Figure 3:
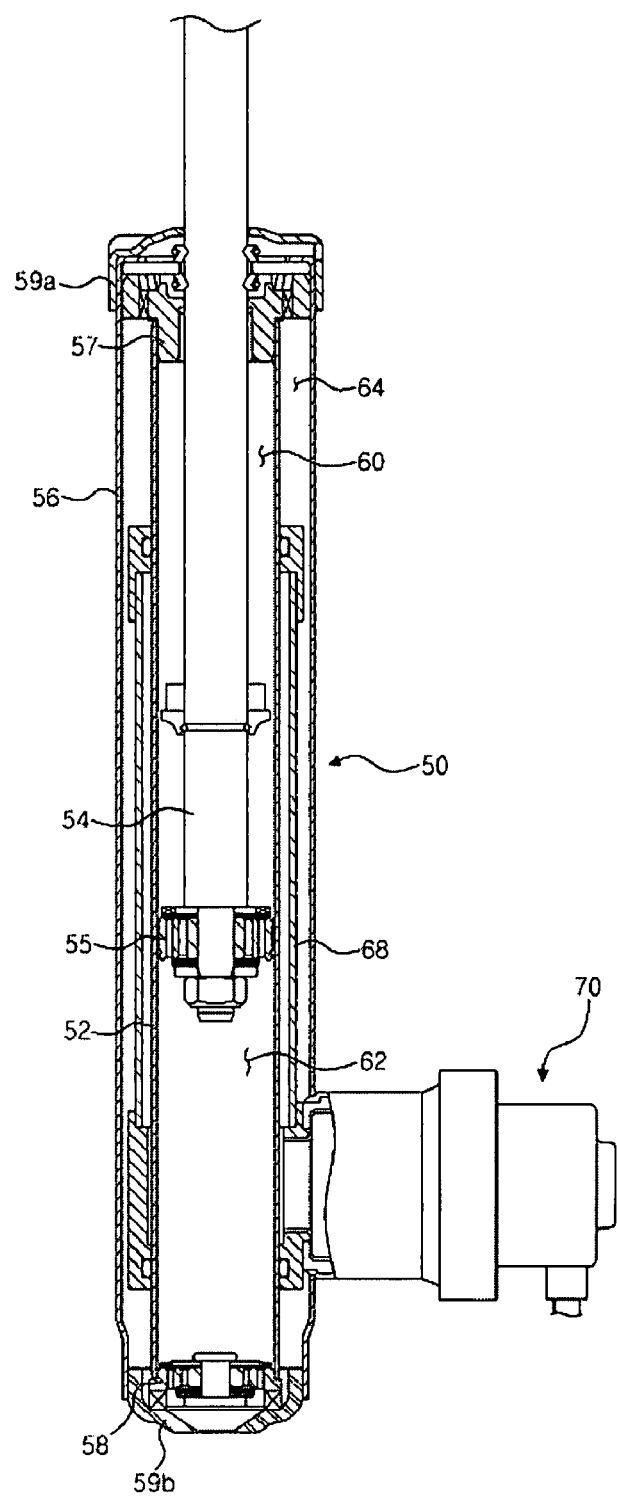
FIG. 3 is a sectional view showing a shock absorber having a damping force control valve according to the present invention.

FIG. 3 is a sectional view showing a shock absorber having a damping force control valve according to the present invention.

As shown in FIG. 3, a shock absorber 50 according to the present invention includes a cylinder 52 which is formed to have predetermined length and diameter and of which the lower end is connected to an axle, and a piston rod 54 which is installed to be linearly movable in the cylinder 52.

Here, the cylinder 52 is filled with working fluid such as gas or oil, and a base shell 56 is arranged in its outside. Meanwhile, a rod guide 57 and a body valve 58 are respectively installed to an upper end of the cylinder 52 and a lower end of the base shell 56. In addition, a piston valve 55 for partitioning the inner space of the cylinder 52 into a tension chamber 60 and a compression chamber 62 is coupled to the lower end of the piston rod 54 to be capable of reciprocating. Also, an upper cap 59a and a base cap 59b are respectively installed to upper and lower portions of the base shell 56.

A reservoir chamber 64 for compensating the volume change in the cylinder 52 according to the vertical movement of the piston rod 54 is formed between the cylinder 52 and the base shell 56, and the reservoir chamber 64 controls the fluid communication with the compression chamber by means of the body valve 58.

Meanwhile, the shock absorber 50 has a damping force control valve 70 installed to one side of the base shell 56 so as to control a damping force. In addition, the shock absorber 50 includes an intermediate tube 68 installed between the cylinder 52 and the base shell 56 to be connected to the compression chamber 62 of the cylinder 52. Also, the damping force control valve 70 has a high pressure region Ph in communication with the tension chamber 60 of the cylinder 52 through the intermediate tube 68, and a low pressure region Pl in communication with the reservoir chamber 64.

Figure 4:
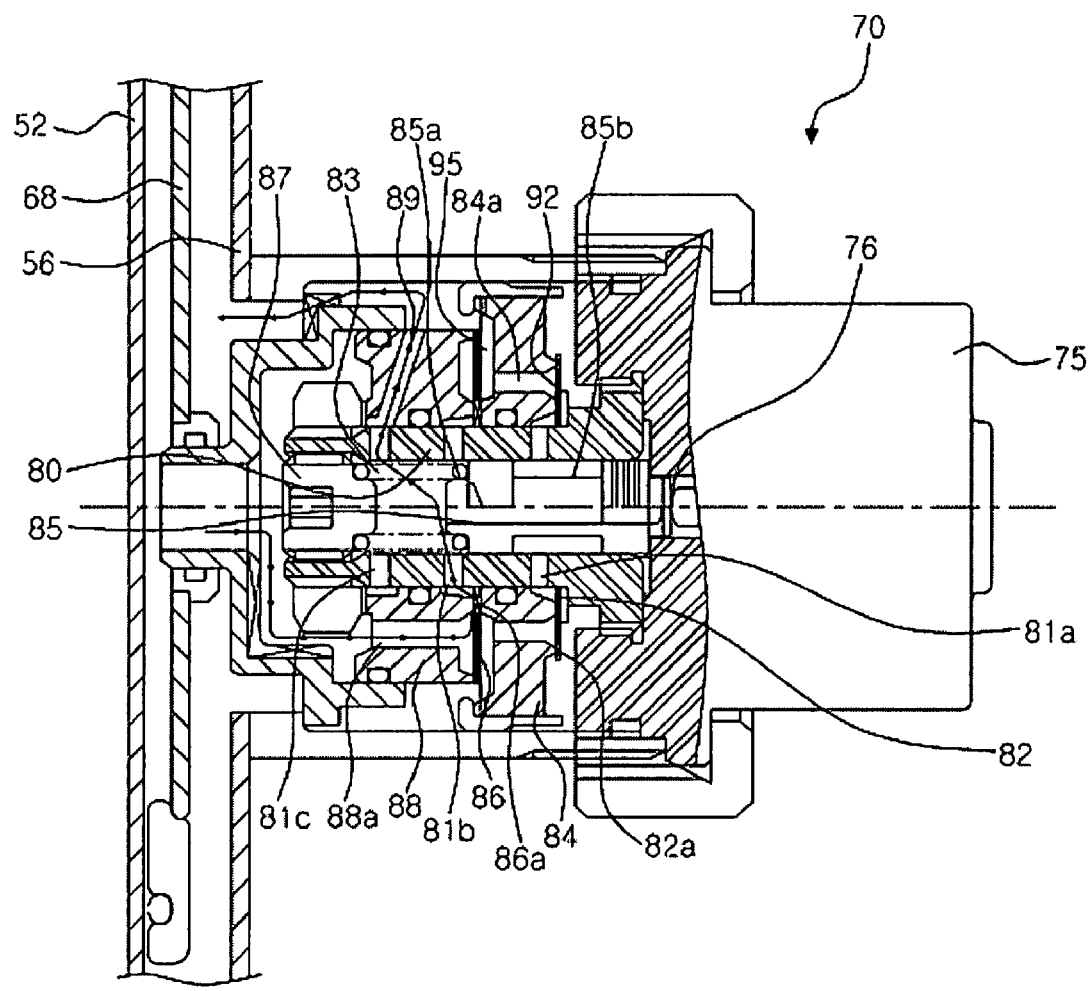
FIGS. 4 to 6 are views showing the operating state of the damping force control valve according to the present invention.
Figure 5:
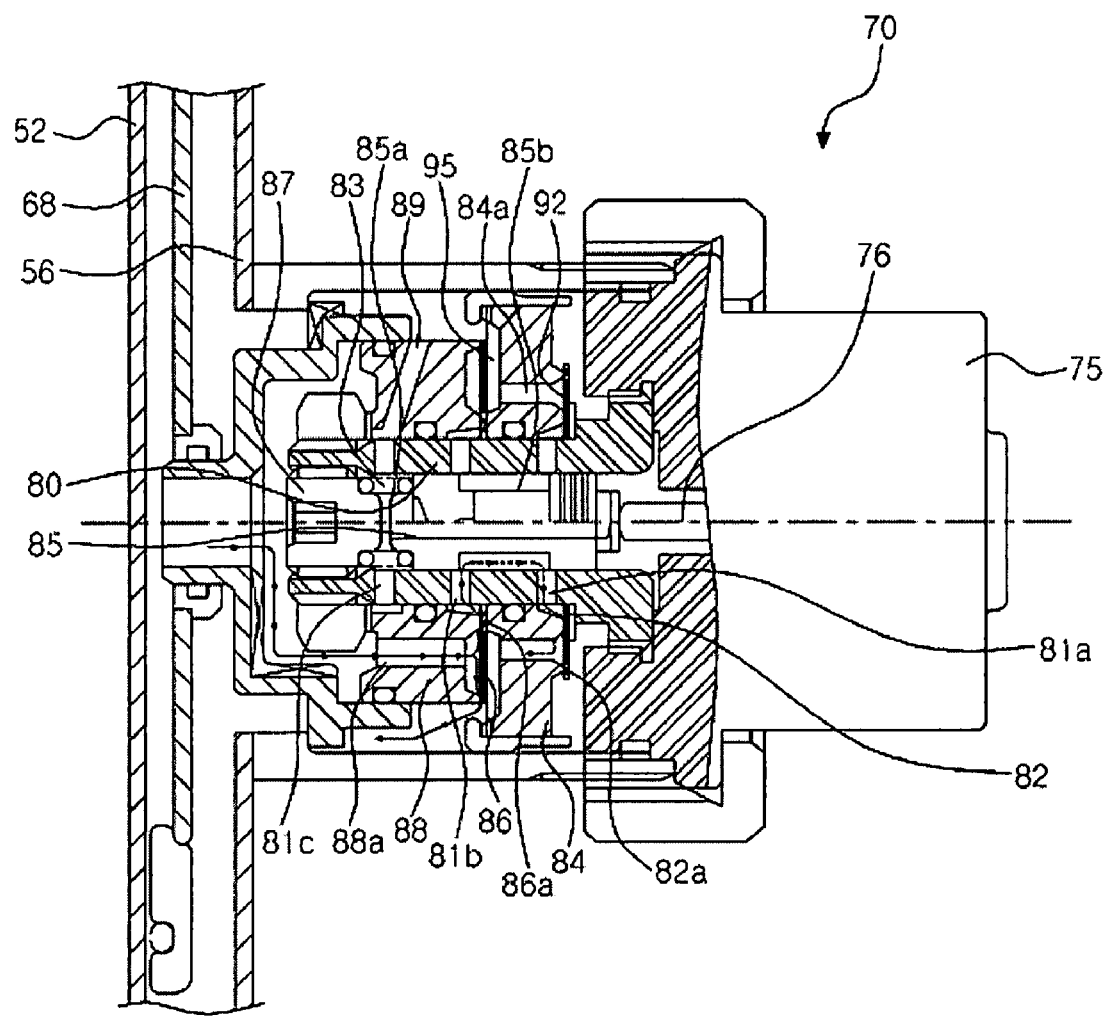
Figure 6:
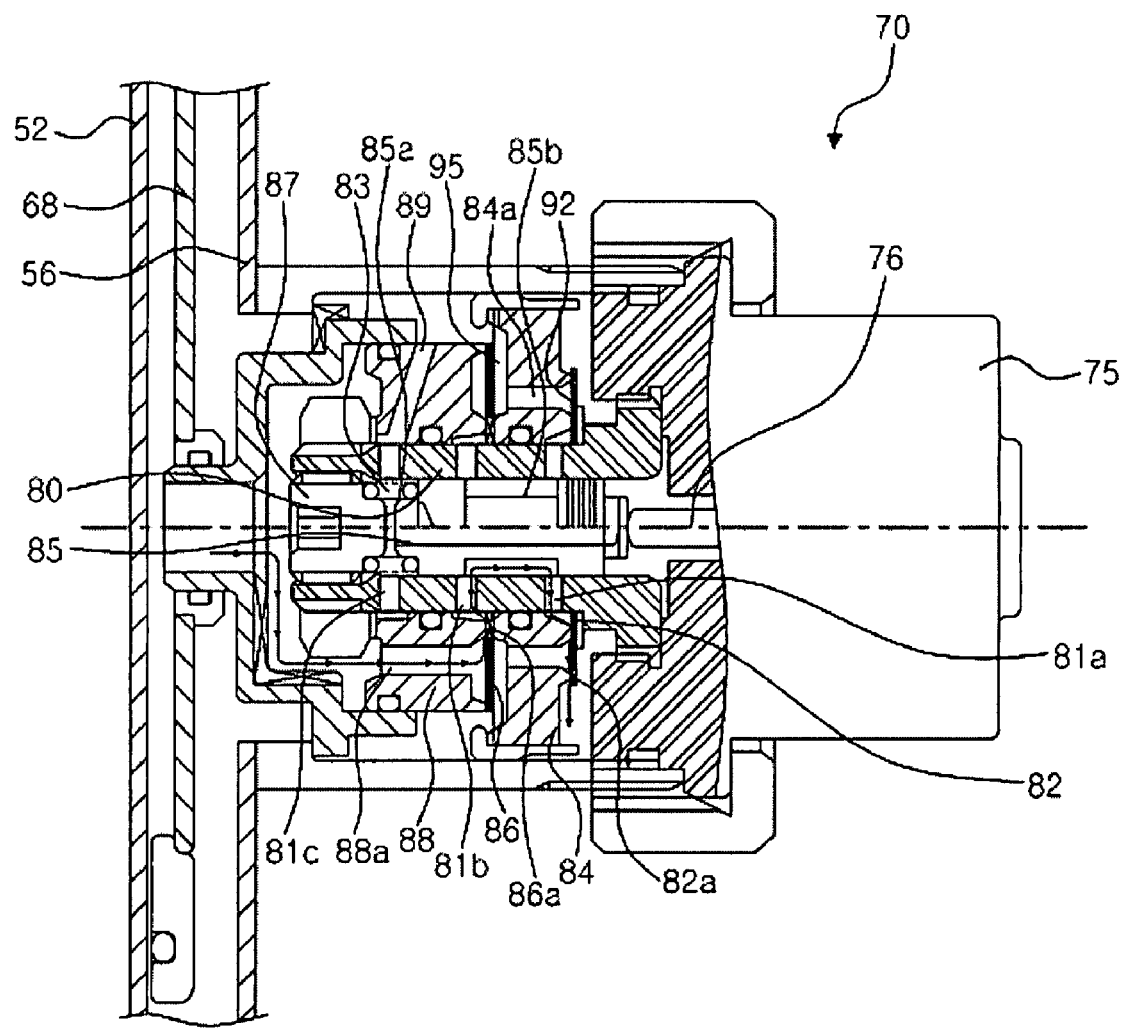

Referring to FIGS. 4 to 6 showing the operating state of the damping force control valve according to the present invention, the damping force control valve will be described below.

The damping force control valve 70 includes a spool 85 cooperates with the pressing rod 76 to be linearly movable in at state the valve is arranged on the same axis as a pressing rod 76 of an actuator 75. In addition, the spool 85, which moves along a spool rod 80, has a plurality of channels formed therein by the spool 85 and the spool rod 80.

In addition, one end of the spool 85 is in contact with the pressing rod 76, and the other end thereof is elastically supported by a compression spring 83. Thus, the spool 85 moves forward by means of the press of the pressing rod 76, and moves back by means of a restoring force of the compression spring 83.

Also, the spool rod 80 is formed in its center with a hollow portion into which the spool 85 is to be inserted, and is formed with a plurality of ports 81a, 81b and 81c in a radial direction so that the hollow portion of the spool rod 80 is connected to the outside thereof. In addition, the spool 85 has a plurality of stepped outer diameters, in the upper portion of which an upper spool slit 85a connected to the hollow portion of the spool rod 80 is formed, and in the lower portion of which a lower spool slit 85b is formed. Also, the spool 85 defines the inner channels by means of the interaction with the spool rod 80, so that the upper spool slit 85a or the lower spool slit 85b communicate with the communication ports 81a, 81b or 81c.

Here, the spool 85 may be controlled by one actuator 75. In addition, the spool 85 is actuated by the actuator 75 to control the communication of a first variable orifice Kvr or a second variable orifice Kcr formed by a selected communication port of the spool rod 80 and the spool 85. Also, a first ring disk 82 is fitted around the spool rod 80, and a lower retainer 84 is coupled to an upper portion of the spool rod 80 to fix the first ring disk 82. In addition, an inflow chamber 92 controlled by the first ring disk 82 is defined in a lower portion of the lower retainer 84, and a pilot chamber 95 is defined in an upper portion thereof. Also, a communication port 84a for allowing the fluid flow between the inflow chamber 92 and the pilot chamber 95 is formed in the lower retainer 84.

A plurality of slits 82a are formed in the circumference of the first ring disk 82, and a second fixed orifice Kc is formed in the first ring disk 82 so as to regularly discharge the fluid of the pilot chamber 95 through the slits 82a. Here, the first ring disk 82 may be formed of a membrane having a disk shape.

The second fixed orifice Kc communicates with a first fixed orifice Kr when the second variable orifice Kcr communicating with the pilot chamber 95 is opened. The second fixed orifice Kc controls the working fluid discharged to the low pressure region Pl so that the working fluid supplied through the second variable orifice Kcr controls the pressure of the pilot chamber 95.

In addition, a second ring disk 86, which is inserted into the spool rod 80 to function as a main valve Km, is arranged in an upper portion of the lower retainer 84, and the second ring disk 86 partitions the pilot chamber 95 from a high pressure region Ph.

The second ring disk 86 is controlled to open or close according to the pressure of the high pressure region Ph, initial preload, and the pressure of the pilot chamber 95. When being opened, the second ring disk 86 allows the working fluid to flow from the high pressure region Ph to the low pressure region Pl.

In addition, a plurality of slits 86a are formed in the inner circumference of the second ring disk 86, and the first fixed orifice Kr for discharging the fluid introduced from the high pressure region Ph is formed therein.

Also, an upper retainer 88 formed with a communication port 88a allowing fluid flow is coupled to the spool rod 80, thus fixing the second ring disk 86. The upper retainer 88 has a bypass channel 89, which is formed to allow the interior of the hollow spool rod 80 to communicate with the low pressure region Pl.

The bypass channel 89 communicates with the first fixed orifice Kr when the first variable orifice Kvr is opened. Meanwhile, the fluid introduced into the first fixed orifice Kr of the second ring disk 86 is introduced into the first variable orifice Kvr or the second variable orifice Kcr that is formed by means of the spool 85 actuated by the actuator 75 and the communication ports 81a, 81b and 81c of the spool rod 80. At this time, the cross sectional area of the second variable orifice Kcr is decreased as that of the first variable orifice Kvr is increased, while the cross sectional area of the second variable orifice Kcr is increased as that of the first variable orifice Kvr is decreased.

Also, a nut 87 is coupled to the spool rod 80, thereby joining the lower retainer 84 and the upper retainer 88.

Thus, if the spool 85 moves back as shown in FIG. 4, the first fixed orifice Kr defined by the slits 86a formed on the inner circumference of the ring disk 86 communicates with the first variable orifice Kvr defined in the top end of the upper outer circumference of the spool 85 and the communication port 81b. At this time, the fluid introduced from the high pressure region Ph is discharged to the bypass channel 89 through the first fixed orifice Kr and the first variable orifice Kvr, and then finally discharged to the low pressure region Pl.

Meanwhile, if the spool 85 moves forward as shown in FIG. 5, the open cross sectional area of the first variable orifice Kvr defined by the communication port 81b and the upper spool slit 85a is decreased.

In addition, if the spool 85 completely moves forward, the first fixed orifice Kr defined by the slits 86a formed in the inner circumference of the ring disk 86 communicates with the second variable orifice Kcr defined in the bottom end of the upper outer circumference of the spool 85 and the communication port 81b. At this time, the fluid introduced from the high pressure region Ph is supplied to the lower spool slit 85b of the spool rod 80 through the first fixed orifice Kr and the second variable orifice Kcr. In addition, a portion of the fluid introduced through the lower spool slit 85b is introduced into the pilot chamber 95 to increase the pressure of the first ring disk 82 that is the main valve Km.

Also, the other fluid introduced through the lower spool slit 85b is discharged to the low pressure region Pl through the second fixed orifice Kc defined by the slits 82a formed in the outer circumference of the first ring disk 82.

Meanwhile, if the pressure of the fluid introduced to the high pressure region Ph is higher than that of the pilot chamber 95, the second ring disk 86 defining the main valve Km is opened, as shown in FIG. 6. Thus, the fluid introduced from the high pressure region Ph is directly discharged to the low pressure region Pi through the main valve Km. In such a process, a high damping force is generated.

Figure 7:
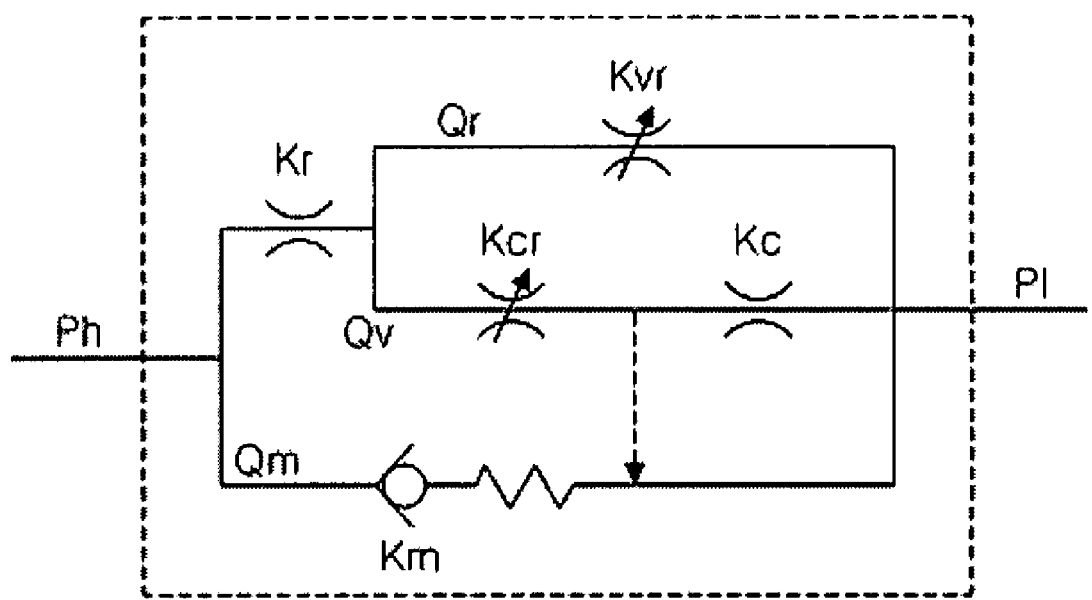
FIG. 7 is a schematic hydraulic circuit diagram showing a channel in the damping force control valve according to the present invention.

FIG. 7 is a schematic hydraulic circuit diagram showing a channel in the damping force control valve 70 according to the present invention. Referring the figure, the operation of the damping force control valve 70 according to the present invention will be explained below.

The damping force control valve 70 according to the present invention includes three channels, as shown in FIG. 7, so that different damping force characteristics are shown by means of the fluid passing through each channel. At this time, the three channels formed in the damping force control valve 70 include a first channel Qm having the main valve Km, a second channel Qr having the first fixed orifice Kr and the first variable orifice Kvr, and a third channel Qv having the first fixed orifice Kr, the second variable orifice Kcr and the second fixed orifice Kc.

The first channel Qm is opened or closed by the main valve Km, and the main valve Km is controlled to open or close according to the pressure of the pilot chamber 95 and the initial preload, which is formed by the operating pressure of the high pressure region Ph, the spring 83 and the like.

In addition, the fluid introduced from the high pressure region Ph is supplied through the first fixed orifice Kr, and supplied to the second channel Qr or the third channel Qv defined when the spool 85 moves forward or backward.

The second channel Qr further includes the first fixed orifice Kr communicating with the high pressure region Ph and the first variable orifice Kvr making the first fixed orifice and the low pressure region Pl communicate with each other. The fluid supplied through the first fixed orifice Kr is introduced into the first variable orifice Kvr and then discharged to the low pressure region Pl through the bypass channel 89.

In addition, the third channel Qv includes the first fixed orifice Kr communicating with the high pressure region Ph, the second variable orifice Kcr making the first fixed orifice Kr and the pilot chamber 95 communicate with each other, and the second fixed orifice Kc making the pilot chamber 95 and the low pressure region Pl communicate with each other. Also, the third channel Qv communicates with the low pressure region Pl when the first fixed orifice Kr, the second variable orifice Kcr and the second fixed orifice Kc are opened, and a portion of the fluid supplied to the third channel Qv is supplied to the pilot chamber 95 to control the opening/closing of the main valve Km. At this time, in case a lot of fluid is supplied through the second variable orifice Kcr, if the amount of fluid supplied to the pilot chamber 95 is increased, the pressure of the main valve Km is increased to reduce an amount of fluid passing through the first channel Qm. Meanwhile, in a case where an amount of fluid supplied through the second variable orifice Kcr is small, if the amount of fluid supplied to the pilot chamber 95 is reduced, the pressure of the main valve Km is decreased to increase an amount of fluid passing through the first channel Qm.

Thus, the first fixed orifice Kr is installed at the inlet of the second variable orifice Kcr and the first variable orifice Kvr to primarily control an amount of fluid supplied to the second channel Qr and the third channel Qv.

In a case where the damping force characteristic formed in such a structure is a soft mode, the area of the first variable orifice Kvr is increased to lower a low-speed damping force, and at the same time, the channel of the second variable orifice Kcr is closed to lower the pressure of the pilot chamber 45, thereby making the main valve Km be opened at a low pressure.

Meanwhile, when the damping force characteristic is a hard mode, the first variable orifice Kvr is closed and the second variable orifice Kcr is opened contrary to the soft mode, thereby increasing the opening pressure of the main valve Km and thus increasing a damping force.

However, in such a structure, if the area of the first variable orifice Kvr is set to be larger than that of the first fixed orifice Kr in the soft mode condition, the pressure at the inlet of the first variable orifice Kvr and the second variable orifice Kcr can be kept relatively lower as compared with the pressure of the high pressure region Ph. Accordingly, the damping force characteristic can be maintained in a low level under the high-speed condition in the soft mode. According to the damping force control valve so configured according to the present invention and the shock absorber using the same, the pressure at the inlet of the first and second variable orifices can be kept relatively lower as compared with that of the high pressure region by primarily limiting an amount of fluid supplied to the second channel and the third channel, and accordingly, the movement of working fluid to the second variable orifice under the high speed condition in a soft mode can be limited, thereby keeping a damping force characteristic at a high speed in a low level. Although the damping force control valve and the shock absorber using the same according to the present invention have been described with the accompanying drawings, the present invention is not limited to the embodiment and drawings. It will be apparent that those skilled in the art can make various modifications and changes thereto within the scope of the invention defined by the claims.

What is claimed is:

1. A damping force control valve, which includes a high pressure region in communication with a tension chamber of a cylinder and a low pressure region in communication with a reservoir chamber, and controls a damping force by adjusting pressure of a pilot chamber by orifices, each of which has a channel controlled to open or close by a spool, the damping force control valve comprising:
    a main valve installed between the high and low pressure regions and controlled to open or close according to pressure of the high pressure region, and an initial preload and pressure of the pilot chamber, the main valve allowing working fluid to flow from the high pressure region to the low pressure region when being opened;
    a first fixed orifice in fluid communication with the high pressure region;
    a first variable orifice configured to be in fluid communication with the first fixed orifice;
    a bypass channel configured to discharge the working fluid supplied by opening the first fixed orifice and the first variable orifice to the low pressure region, the first variable orifice making the first fixed orifice and the low pressure region communicate with each other; and
    a second variable orifice configured to facilitate fluid communication between the first fixed orifice and the pilot chamber; and
    a second fixed orifice to control the working fluid discharged to the low pressure region so that the working fluid supplied by opening the first fixed orifice and the second variable orifice controls a pressure of the pilot chamber, the second variable orifice making the first fixed orifice and the pilot chamber communicate with each other.

2. The damping force control valve as claimed in claim 1, further comprising:
    an actuator configured to operate the spool to open or close the first variable orifice and the second variable orifice.

3. The damping force control valve as claimed in claim 1 wherein open cross sectional areas of the first variable orifice and the second variable orifice are in inverse proportion to each other.

4. The damping force control valve as claimed in claim 1 wherein the main valve includes a membrane having an integrated disk shape.

5. A shock absorber comprising the damping force control valve as claimed in claim 1 and a cylinder having a compression chamber and a reservoir chamber, the high pressure region and the low pressure region of the damping force control valve being in fluid communication with the compression chamber and the reservoir chamber of the cylinder.

6. A damping force control valve comprising:
    a pilot chamber;
    a high pressure region in fluid communication with a tension chamber;
    a low pressure region in fluid communication with a reservoir chamber;
    a main valve installed between the high and low pressure regions and controlled to open or close according to pressure of the high pressure region and an initial preload and pressure of the pilot chamber, the main valve allowing working fluid to flow from the high pressure region to the low pressure region when being opened;
    a first fixed orifice in fluid communication with the high pressure region;
    a first variable orifice configured to be in fluid communication with the first fixed orifice;

a bypass channel in fluid communication with the low pressure region, the first variable orifice configured to facilitate fluid communication between the bypass channel and the first fixed orifice when the first variable orifice is in an open state, to discharge the working fluid to the low pressure region through the bypass channel;

a second variable orifice configured to facilitate fluid communication between the first fixed orifice and the pilot chamber when the second variable orifice is in an open state; and a second fixed orifice configured to facilitate fluid communication between the pilot chamber and the low pressure region to control the working fluid discharged to the low pressure region, the second variable orifice controlling a pressure of the pilot chamber when the second variable orifice is in an open state.

* * * * *